(12) United States Patent
Huang (10) Patent No.: US 12,393,259 B2
(45) Date of Patent: Aug. 19, 2025

(54) CONTROL DEVICE AND OPERATION METHOD THEREOF

(71) Applicant: Nuvoton Technology Corporation, Hsinchu Science Park (TW)

(72) Inventor: Chi-Ray Huang, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 121 days.

(21) Appl. No.: 18/321,329

(22) Filed: May 22, 2023

(65) Prior Publication Data

US 2024/0019924 A1 Jan. 18, 2024

(30) Foreign Application Priority Data

Jul. 14, 2022 (TW) ................................. 111126509

(51) Int. Cl.
*G06F 1/26* (2006.01)
*G06F 1/3296* (2019.01)

(52) U.S. Cl.
CPC ................................. *G06F 1/3296* (2013.01)

(58) Field of Classification Search
CPC .................................................... G06F 1/3296
See application file for complete search history.

(56) References Cited

U.S. PATENT DOCUMENTS

| | | | | |
|---|---|---|---|---|
| 10,014,869 B1* | 7/2018 | Bowles | ................... | H03K 3/017 |
| 2011/0099397 A1* | 4/2011 | Rotem | ................... | G06F 1/3203 |
| | | | | 713/320 |
| 2013/0080795 A1* | 3/2013 | Sistla | ................... | G06F 13/4022 |
| | | | | 713/300 |
| 2018/0260017 A1* | 9/2018 | Ehmann | ................... | G06F 1/3287 |
| 2020/0050251 A1* | 2/2020 | Naik | ................... | G06F 9/3869 |
| 2021/0157381 A1* | 5/2021 | Goffman-Vinopal | ................... | |
| | | | | G06F 1/324 |
| 2021/0337373 A1* | 10/2021 | Soini | ................... | H04W 8/205 |

FOREIGN PATENT DOCUMENTS

| | | |
|---|---|---|
| CN | 111630471 A | 9/2020 |
| CN | 113672075 A | 11/2021 |
| CN | 113906678 A | 1/2022 |
| CN | 114450652 A | 5/2022 |
| TW | 200736935 A | 10/2007 |
| TW | 201716926 A | 5/2017 |
| TW | 201725477 A | 7/2017 |

* cited by examiner

*Primary Examiner* — Mohammed H Rehman
(74) *Attorney, Agent, or Firm* — MUNCY, GEISSLER, OLDS & LOWE, P.C.

(57) ABSTRACT

A control device includes a first area, a second area and a third area. The first area includes a peripheral unit, a storage unit and a control unit. The second area includes a peripheral unit, an access unit, a storage unit and a control unit. The third area includes an operating unit, a peripheral unit, an access unit, a storage unit and a control unit. In an ultra-low-power mode, a low-power mode and a high-speed mode, a first working voltage and a first clock signal are provided to the first area. In the low-power mode or the high-speed mode, the first working voltage and a second clock signal are provided to the second area. In the high-speed mode, the first working voltage and a third clock signal are provided to the third area.

20 Claims, 5 Drawing Sheets

CONTROL DEVICE AND OPERATION METHOD THEREOF

CROSS REFERENCE TO RELATED APPLICATIONS

This application claims priority of Taiwan Patent Application No. 111126509, filed on Jul. 14, 2022, the entirety of which is incorporated by reference herein.

TECHNICAL FIELD

The present invention relates to a control device, and in particular it relates to a control device with high speed and low power consumption and an operation method thereof.

BACKGROUND

In general, control devices (such as micro controllers) are designed to have several internal elements. They provide the working voltages required by these internal elements, so that the control device operates at high speed. However, since control devices are not always operating in a high-speed state, and the control device still provides the working voltages required by the internal elements in the high-speed state, the power consumption of the control device may be increased.

Therefore, how to effectively design a control device with high speed and low power consumption has become a focus of technical improvements.

SUMMARY

An embodiment of the present invention provides a control device and an operation method thereof, thereby achieving high speed and low power consumption.

An embodiment of the present invention provides a control device, which includes a first area, a second area and a third area. The first area includes a first peripheral unit, a first storage unit and a first control unit. The second area includes a second peripheral unit, a first access unit, a second storage unit and a second control unit. The third area includes an operating unit, a third peripheral unit, a second access unit, a third storage unit and a third control unit. In an ultra-low-power mode, a first working voltage and a first clock signal are provided to the first area. In a low-power mode, the first working voltage and the first clock signal are provided to the first area, and the first working voltage and a second clock signal are provided to the second area. In a high-speed mode, the first working voltage and the first clock signal are provided to the first area, and the first working voltage and a third clock signal are provided to the third area, or the first working voltage and the first clock signal are provided to the first area, the first working voltage and the second clock signal are provided to the second area, and the first working voltage and the third clock signal are provided to the third area.

An embodiment of the present invention provides an operation method of a control device, which includes the following steps. A first area including a first peripheral unit, a first storage unit and a first control unit is provided. A second area including a second peripheral unit, a first access unit, a second storage unit and a second control unit is provided. A third area including an operating unit, a third peripheral unit, a second access unit, a third storage unit and a third control unit is provided. In an ultra-low-power mode, a first working voltage and a first clock signal are provided to the first area. In a low-power mode, the first working voltage and the first clock signal are provided to the first area, and the first working voltage and a second clock signal are provided to the second area. In a high-speed mode, the first working voltage and the first clock signal are provided to the first area, and the first working voltage and a third clock signal are provided to the third area, or the first working voltage and the first clock signal are provided to the first area, the first working voltage and the second clock signal are provided to the second area, and the first working voltage and the third clock signal are provided to the third area.

According to the control device and the operation method thereof disclosed by the present invention, the first area, the second area and the third area are configured. The number of elements of the first area is less than the number of elements of the second area. The number of elements of the second area is less than the number of elements of the third area. The corresponding working voltages and clock signals are provided to the first area, the second area and/or the third area according to the different modes (i.e., the ultra-low-power mode, the low-power mode and the high-speed mode). Therefore, high speed and low power consumption may be achieved.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It should be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It should be acknowledged that although the terms "first", "second", "third", and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

In each of the following embodiments, the same reference number represents an element or component that is the same or similar.

Figure 1:
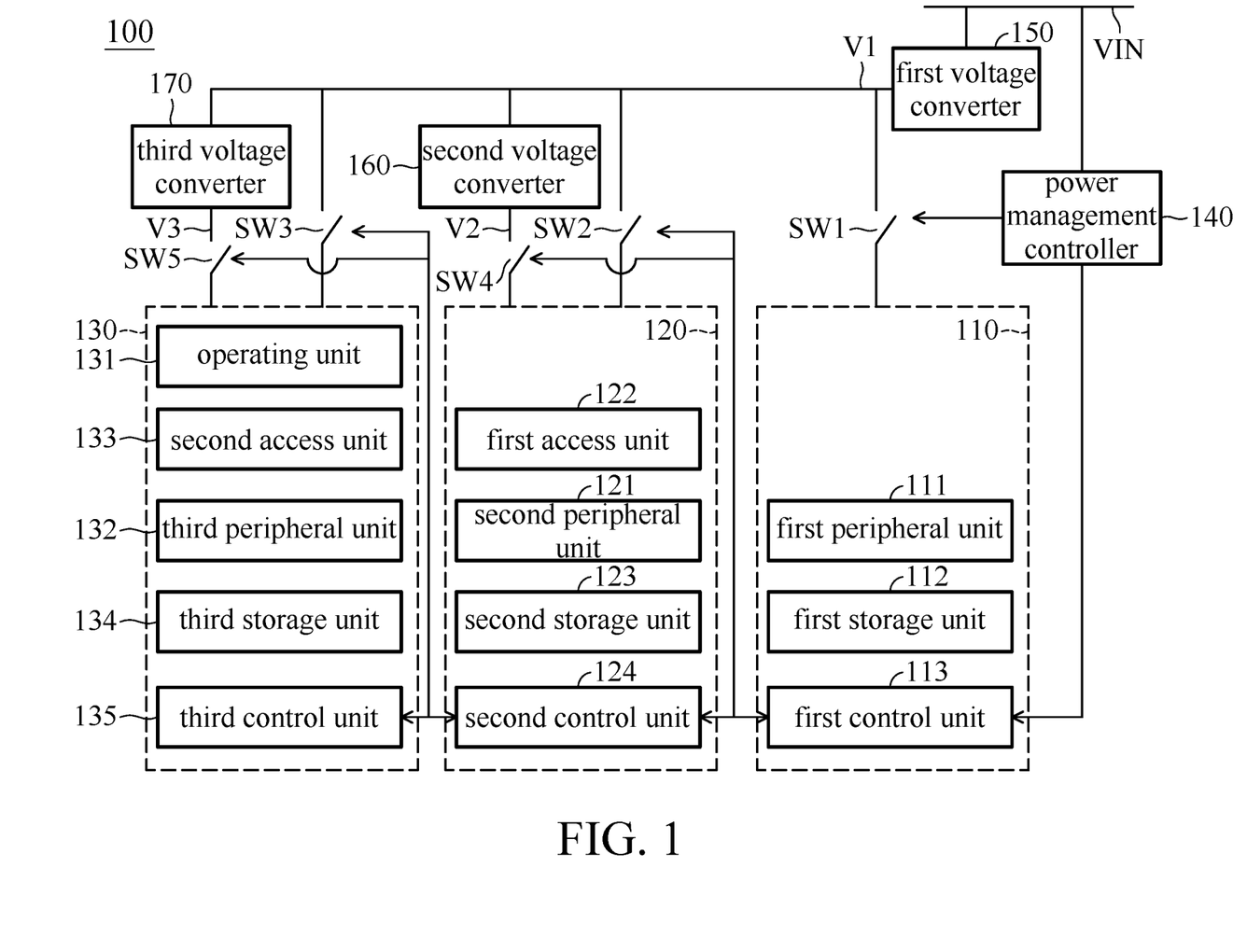
FIG. 1 is a schematic view of a control device according an embodiment of the present invention.

FIG. 1 is a schematic view of a control device according an embodiment of the present invention. In the embodiment, the control device 100 may be a micro controller unit (MCU), a microprocessor or another suitable controller, but the embodiment of the present invention is not limited thereto. Please refer to FIG. 1. The control device 100 may include a first area 110, a second area 120 and a third area 130.

The first area 110 may include a first peripheral unit 111, a first storage unit 112 and a first control unit 113. The second area 120 may include a second peripheral unit 121, a first access unit 122, a second storage unit 123 and a second control unit 124. The third area 130 may include an operating unit 131, a third peripheral unit 132, a second access unit 133, a third storage unit 134 and a third control unit 135.

In the embodiment, a number of elements of the first peripheral unit 111 is, for example, is less than a number of elements of the second peripheral unit 121, and the number of elements of the second peripheral unit 121 is, for example, less than a number of elements of the third peripheral unit 132.

Figure 2:
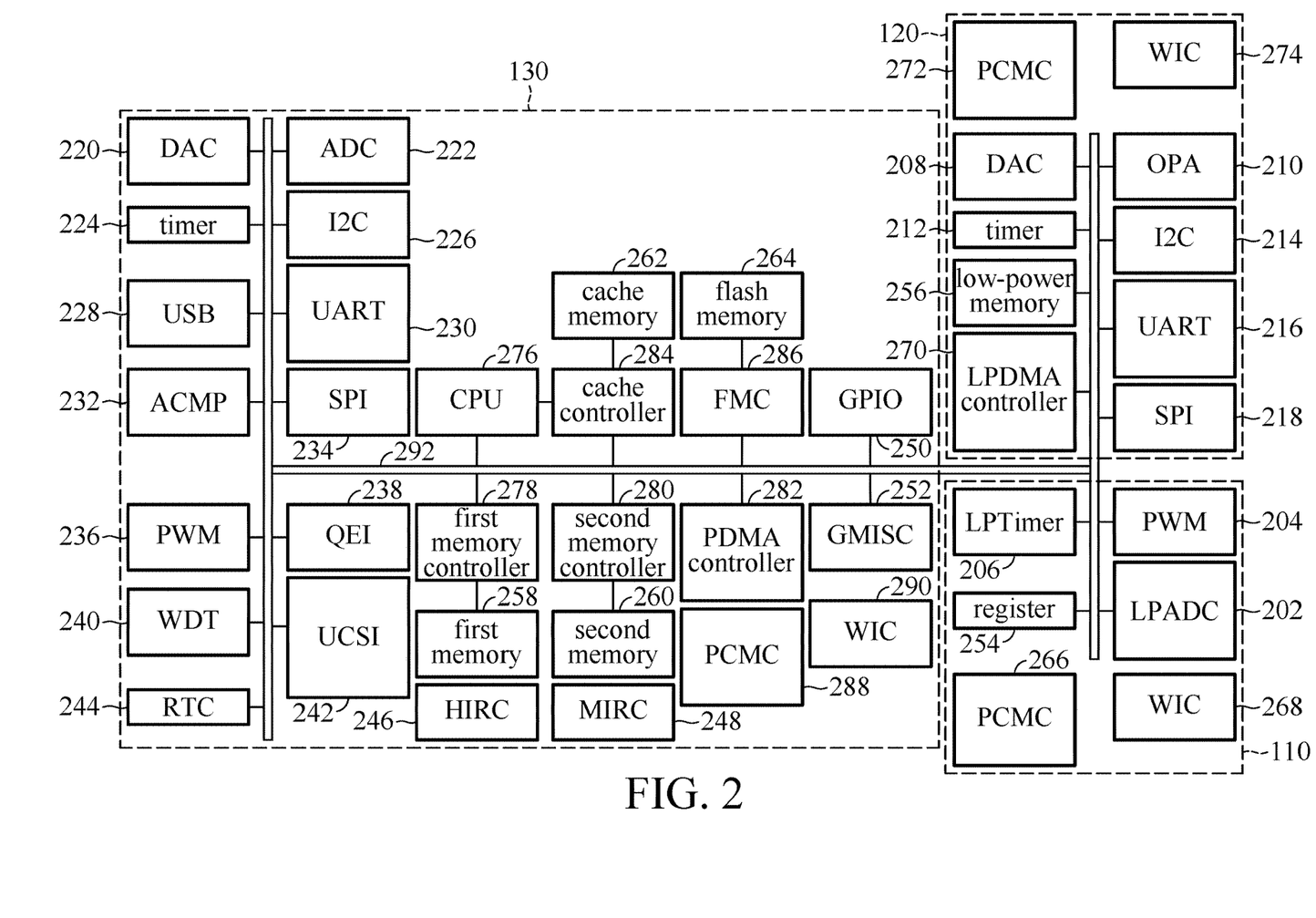
FIG. 2 is a detailed schematic view of a first area, a second area and a third area of the control device according an embodiment of the present invention.

As shown in FIG. 2, in some embodiments, the first peripheral unit 111 may include a low power analog-to-digital converter (LPADC) 202, a pulse width modulator (PWM) 204 and a low-power timer (LPTimer) 206. As shown in FIG. 2, in some embodiments, the second peripheral unit 121 may include a digital-to-analog converter (DAC) 208, an operation amplifier (OPA) 210, a timer 212, an inter-integrated circuit (I2C) 214, a universal asynchronous receiver/transmitter (UART) 216 and a serial peripheral interface (SPI) 218.

As shown in FIG. 2, in some embodiments, the third peripheral unit 132 may include a digital-to-analog converter (DAC) 220, an analog-to-digital converter (ADC) 222, a timer 224, an inter-integrated circuit (I2C) 226, a universal series bus (USB) 228, a universal asynchronous receiver/transmitter (UART) 230, an analog comparator (ACMP) 232, a serial peripheral interface (SPI) 234, a pulse width modulator (PWM) 236, a quadrature encoder interface (QEI) 238, a watch dog timer (WDT) 240, a USB Type-C connector system software interface (UCSI) 242, a real time clock (RTC) 244, a high speed internal RC oscillator (HIRC) 246, a medium speed internal RC oscillator (MIRC) 248, a general-purpose input/output (GPIO) port 250 and a global miscellaneous control register (GMISC) 252.

In addition, a size of the first storage unit 112 is, for example, smaller than a size of the second storage unit 123, and the size of the second storage unit 122 is, for example, smaller than a size of the third storage unit 134. As shown in FIG. 2, in some embodiments, the first storage unit 112 may include a register 254. As shown in FIG. 2, in some embodiments, the second storage unit 123 may include a low-power memory 256, such as a low power static random access memory (LPSRAM). As shown in FIG. 2, in some embodiments, the third storage unit 134 may include a first memory 258, a second memory 260, a cache memory 262 and a flash memory 264. In the embodiment, each of the first memory 258 and the second memory 260 is, for example, a static random access memory (SRAM).

As shown in FIG. 2, in some embodiments, the first control unit 113 may include a power and clock management controller (PCMC) 266 and a wake-up and interrupt controller (WIC) 268. As shown in FIG. 2, in some embodiments, the first access unit 122 may include a low power direct memory access (LPDMA) controller 270. As shown in FIG. 2, in some embodiments, the second control unit 124 may include a power and clock management controller 272 and a wake-up and interrupt controller 274.

As shown in FIG. 2, in some embodiments, the operation unit 131 may include a central processing unit (CPU) 276. As shown in FIG. 2, in some embodiments, the second access unit 133 may include a first memory controller 278, a second memory controller 280, a peripheral direct memory access (PDMA) controller 282, a cache controller 284 and a flash memory controller (FMC) 286. In the embodiment, each of the first memory controller 278 and the second memory controller 280 is, for example, a SRAM controller. In addition, the first memory controller 278 is electrically connected to the first memory 258. The second memory controller 280 is electrically connected to the second memory 260. The cache controller 284 is electrically connected to the cache memory 262 and the central processing unit 276. The flash memory controller 286 is electrically connected to the flash memory 264.

As shown in FIG. 2, in some embodiments, the third control unit 135 may include a power and clock management controller 288 and a wake-up and interrupt controller 290.

In the embodiment, the low power analog-to-digital converter 202, the pulse width modulator 204, the low-power timer 206, the digital-to-analog converter 208, the operation amplifier 210, the timer 212, the inter-integrated circuit 214, the universal asynchronous receiver/transmitter 216, the serial peripheral interface 218, the digital-to-analog converter 220, the analog-to-digital converter 222, the timer 224, the inter-integrated circuit 226, the universal series bus 228, the universal asynchronous receiver/transmitter 230, the analog comparator 232, the serial peripheral interface 234, the pulse width modulator 236, the quadrature encoder interface 238, the watch dog timer 240, the USB Type-C connector system software interface 242, the real time clock 244, the general-purpose input/output port 250, the global miscellaneous control register 252, the low power direct memory access controller 270, the central processing unit 276, the first memory controller 278, the second memory controller 280, the peripheral direct memory access controller 282, the cache controller 284 and the flash memory controller 286 are electrically connected to a bus 292 for communication through the bus 292. In the embodiment, the bus 292 may include an advanced peripheral bus (APB) and an advanced high-performance bus (AHB), but the embodiment of the present invention is not limited thereto.

In the embodiment, the control device 100 further includes a power management controller 140, a first voltage converter 150, a first switch unit SW1, a second switch unit SW2 and a third switch unit SW3.

The power management controller 140 is configured to receive a power voltage VIN, generate a first control signal, and generate a second control signal to the first control unit 113. The first voltage converter 150 is configured to receive the power voltage VIN to generate the first working voltage V1.

The first switch unit SW1 is electrically connected to the first voltage converter 150, the power management controller 140 and the first area 110 (i.e., the first peripheral unit 111, the first storage unit 112 and the first control unit 113). The first switch unit SW1 may be configured to determine whether to provide the first working voltage V1 to the first area 110 according to the first control signal. For example, when the first switch unit SW1 receives the first control signal having, for example, a high logic level, the first switch unit SW1 may be turned on to provide the first working voltage V1 to the first area 110. Furthermore, the first working voltage V1 may be provided to the first peripheral unit 111, the first storage unit 112 and the first control unit 113 of the first area 110, so that the first peripheral unit 111, the first storage unit 112 and the first control unit 113 operate normally. When the first switch unit SW1 receives the first control signal having, for example, a low logic level, the first switch unit SW1 may not be turned on, and may not provide the first working voltage V1 to the first area 110.

The second switch unit SW2 is electrically connected to the first voltage converter 150, the first control unit 113 and the second control unit 124. In addition, the second switch unit 120 is further electrically connected to the second peripheral unit 121, the first access unit 122 and the second storage unit 123. The second switch unit SW2 may be configured to determine whether to provide the first working voltage V1 to the second area 120 according to a control of the first control unit 113 and/or the second control unit 124. For example, when the second switch unit SW2 receives the control signal having, for example, a high logic level provided by the first control unit 113 and/or the second control unit 124, the second switch unit SW2 may be turned on to provide the first working voltage V1 to the second area 120. Furthermore, the first working voltage V1 may be provided to the second peripheral unit 121, the first access unit 122, the second storage unit 123 and the second control unit 124 of the second area 120, so that the second peripheral unit 121, the first access unit 122, the second storage unit 123 and the second control unit 124 operate normally. When the second switch unit SW2 receives the control signal having, for example, a low logic level provided by the first control unit 113 and/or the second control unit 124, the second switch unit SW2 may not be turned on, and may not provide the first working voltage V1 to the second area 120.

The third switch unit SW3 is electrically connected to the first voltage converter 150, the second control unit 124 and the third control unit 135. In addition, the third switch unit SW3 is further electrically connected to the operation unit 131, the third peripheral unit 132, the second access unit 133 and the third storage unit 134. The third switch unit SW3 may be configured to determine whether to provide the first working voltage V1 to the third area 130 according to a control of the second control unit 124 and/or the third control unit 135. For example, when the third switch unit SW3 receives the control signal having, for example, a high logic level provided by the second control unit 124 and/or the third control unit 135, the third switch unit SW3 may be turned on to provide the first working voltage V1 to the third area 130.

Furthermore, the first working voltage V1 may be provided to the operation unit 131, the third peripheral unit 132, the second access unit 133, the third storage unit 134 and the third control unit 135 of the third area 130, so that the operation unit 131, the third peripheral unit 132, the second access unit 133, the third storage unit 134 and the third control unit 135 operate normally. When the third switch unit SW3 receives the control signal having, for example, a low logic level provided by the second control unit 124 and/or the third control unit 135, the third switch unit SW3 may not be turned on, and may not provide the first working voltage V1 to the third area 130.

In the operation of the control device 100, in an ultra-low-power mode, the power management controller 140 generates a first control signal having a high logic level to the first switch unit SW1, so that the first switch unit SW1 is turned on to provide the first working voltage V1 to the first area 110. In addition, the power management controller 140 provides a second control signal with the high logic level to the first control unit 113 of the first area 110, so that the power and clock management controller 266 of the first control unit 113 may provide the first clock signal to the first area 110 to provide the working clock required by the first peripheral unit 111.

In a low-power mode, the first control unit 113 (such as the power and clock management controller 266) may generate the control signal having, for example, the high logic level to the second switch unit SW2, so that the second switch unit SW2 is turned on to provide the first working voltage V1 to the second area 120. In addition, the first control unit 113 (such as the wake-up and interrupt controller 268) may provide a wake-up signal to the second control unit 124 (such as the power and clock management controller 272), so as to wake up the second area 120. Then, the second control unit 124 (such as the power and clock management controller 272) may generate the second clock signal to the second area 120 according to the wake-up signal, so as to provide the working clock required by the second peripheral unit 121 and the first access unit 122, so that the second area 120 may complete the required task. For example, the first access unit 122 (i.e., the low power direct memory access controller 270) assists in moving the data to the second storage unit 123 (i.e., the low-power memory 256).

Then, after the second area 120 completes the required task, the first control unit 113 and/or the second control unit 124 may generate the control signal having, for example, the low logic level to the second switch unit SW2, so that the second switch unit SW2 is not turned on, so as to turn off the operation of the second area 120. Therefore, the power consumption of the control device 100 may be effectively saved.

In a high-speed mode, the second control unit 124 (such as the power and clock management controller 272) may generate the control signal having, for example, the high logic level to the third switch unit SW3, so that the third switch unit SW3 is turned on to provide the first working voltage V1 to the third area 130. In addition, the second control unit 124 (such as the wake-up and interrupt controller 274) may provide a wake-up signal to the third control unit 135, so as to wake up the third area 130. Then, the third control unit 135 may generate the third clock signal to the third area 130 according to the wake-up signal, so as to provide the working clock required by the operation unit 131, the third second peripheral unit 132 and the second access unit 133, so that the third area 130 may complete the required task. For example, the computing operation is performed using the operation unit 131 (i.e., the central processing unit 276).

Then, after the third area 130 completes the required task, the second control unit 124 and/or the third control unit 135 may generate the control signal having, for example, the low logic level to the third switch unit SW3, so that the third switch unit SW3 is not turned on, so as to turn off the operation of the third area 130. Therefore, the power consumption of the control device 100 may be effectively saved.

In addition, in some embodiments the control device 100 further includes a second voltage converter 160, a fourth switch unit SW4, a third voltage converter 170 and a fifth switch unit SW5.

The second voltage converter 160 is electrically connected to the first voltage converter 150. The second voltage converter 160 may receive be configured to receive the first working voltage V1 to generate a second working voltage V2. The fourth switch unit SW4 is electrically connected to the second voltage converter 160, the first control unit 113 and the second control unit 124. In addition, the fourth switch unit SW4 is further electrically connected to the second storage unit 123. The fourth switch unit SW4 may be configured to determine whether to provide the second working voltage V2 to the second storage unit 123 and the second control unit 124 of the second 120 according to the control of the first control unit 113 and/or the second control unit 124.

For example, when the fourth switch unit SW4 receives the control signal having, for example, a high logic level provided by the first control unit 113 and/or the second control unit 124, the fourth switch unit SW4 may be turned on to provide the second working voltage V2 to the second storage unit 123 and the second control unit 124 of the second area 120, so that the second storage unit 123 and the second control unit 124 operate normally. When the fourth switch unit SW4 receives the control signal having, for example, a low logic level provided by the first control unit 113 and/or the second control unit 124, the fourth switch unit SW4 may not be turned on, and may not provide the second working voltage V2 to the second storage unit 123 and the second control unit 124 of the second area 120.

The third voltage converter 170 is electrically connected to the first voltage converter 150. The third voltage converter 170 may be configured to receive the first working voltage V1 to generate a third working voltage V3. The fifth switch unit SW5 is electrically connected to the third voltage converter 170, the second control unit 124 and the third control unit 135. In addition, the fifth switch unit SW5 is further electrically connected to the third storage unit 134. The fifth switch unit SW5 may be configured to determine whether to provide the third working voltage V3 to the third storage unit 134 and the third control unit 135 of the third area 130 according to the control of the second control unit 124 and/or the third control unit 135.

For example, when the fifth switch unit SW5 receives the control signal having, for example, a high logic level provided by the second control unit 124 and/or the third control unit 135, the fifth switch unit SW5 may be turned on to provide the third working voltage V3 to the third storage unit 134 and the third control unit 135 of the third area 130, so that the third storage unit 134 and the third control unit 135 operate normally. When the fifth switch unit SW5 receives the control signal having, for example, a low logic level provided by the second control unit 124 and/or the third control unit 135, the fifth switch unit SW5 may not be turned on, and may not provide the third working voltage V3 to the third storage unit 134 and the third control unit 135 of the third area 130.

In the embodiment, the second working voltage V2 and the third working voltage V3 are, for example, smaller than the first working voltage V1. In addition, the second working voltage V2 and the third working voltage V3 may be the same or different. Furthermore, each of the second voltage converter 160 and the third voltage converter 170 is, for example, a low dropout regulator (LDO).

In the operation of the control device 100, in the ultra-low-power mode, the power management controller 140 generates the first control signal having the high logic level to the first switch unit SW1, so that the first switch unit SW1 is turned on to provide the first working voltage V1 to the first area. In addition, the power management controller 140 provides the second control signal with the high logic level to the first control unit 113 of the first area 110, so that the power and clock management controller 266 of the first control unit 113 may provide the first clock signal to the first area 110 to provide the working clock required by the first peripheral unit 111.

Then, the first control unit 113 (such as the power and clock management controller 266) may provide the control signal to the fourth switch unit SW4, so that the fourth switch unit SW2 is turned on to provide the second working voltage V2 to the second storage unit 123 and the second control unit 124 of the second area 120. In addition, the first control unit 113 (such as the wake-up and interrupt controller 268) may provide the wake-up signal to the second control unit 124, so as to wake up the second control unit 124, so that the second area 120 is in a standby state.

Afterward, the second control unit 124 (such as the power and clock management controller 272) may provide the control single to the fifth switch unit SW5, so that the fifth switch unit SW5 is turned on to provide the third working voltage V3 to the third storage unit 134 and the third control unit 135 of the third area 130. In addition, the second control unit 124 (such as the wake-up and interrupt controller 274) may provide the wake-up signal to the third control unit 135, so as to wake up the third control unit 135, so that the third area 130 is in the standby state. Therefore, the wakeup time of the second area 120 and/or the third area 130 may be effectively saved, and the power consumption of the control device 100 may be saved.

In the low-power mode, the first control unit 113 (such as the power and clock management controller 266) and/or the second control unit 124 (such as the power and clock management controller 272) may generate the control signal having, for example, the high logic level to the second switch unit SW2 and generate the control signal having, for example, the low logic level to the fourth switch unit SW4, so that the second switch unit SW2 is turned on and the fourth switch unit SW4 is not turned on, so as to provide the first working voltage V1 to the second area 120. In addition, the first control unit 113 (such as the wake-up and interrupt controller 268) and/or the second control unit 124 (such as the wake-up and interrupt controller 274) may provide the wake-up signal to the second control unit 124 (such as the power and clock management controller 272) Then, the second control unit 124 (such as the power and clock management controller 272) may generate the second clock signal to the second area 120 according to the wake-up signal, so as to provide the working clock required by the second peripheral unit 121 and the first access unit 122, so that the second area 120 may complete the required task.

Then, after the second area 120 completes the required task, the first control unit 113 and/or the second control unit 124 may generate the control signal having, for example, the low logic level to the second switch unit SW2 and generate the control signal having, for example, the high logic level to the fourth switch unit SW4, so that the second switch unit SW2 is not turned on and the fourth switch unit SW4 is turned on, so as to provide the second working voltage V2 to the second storage unit 123 and the second control unit 124 of the second area 120, thereby maintaining the operations of the second storage unit 123 and the second control unit 124. Therefore, the power consumption of the control device 100 may be effectively saved.

In the high-speed mode, the second control unit 124 (such as the power and clock management controller 272) and/or the third control unit 135 (such as the power and clock management controller 288) may generate the control signal having, for example, the high logic level to the third switch unit SW3 and generate the control signal having, for example, the low logic level to the fifth switch unit SW5, so that the third switch unit SW3 is turned on and the fifth switch unit SW5 is not turned on, so as to provide the first working voltage V1 to the third area 130. In addition, the second control unit 124 (such as the wake-up and interrupt controller 274) and/or the third control unit 135 (such as the wake-up and interrupt controller 290) may provide the wake-up signal to the third control unit 135 (such as the power and clock management controller 290). Then, the third control unit 135 (such as the power and clock management controller 290) may generate the third clock signal to the third area 130 according to the wake-up signal, so as to provide the working clock required by the operation unit 131, the third second peripheral unit 132 and the second access unit 133, so that the third area 130 may complete the required task. At this time, the first area 110, the second area 120 and the third area 130 are all in operation.

Then, after the third area 130 completes the required task, the second control unit 124 and/or the third control unit 135 may generate the control signal having, for example, the low logic level to the third switch unit SW3 and generate the control signal having, for example, the high logic level to the fifth switch unit SW5, so that the third switch unit SW3 is not turned on and the fifth switch unit SW5 is turned on, so as to provide the third working voltage V3 to the third storage unit 134 and the third control unit 135 of the third area 130, thereby maintaining the operations of the third storage unit 134 and the third control unit 135. At this time, the first area 110 and the second area 120 still operate. Therefore, the power consumption of the control device 100 may be effectively saved.

In the high-speed mode, in an embodiment, the first control unit 113 may communicate with the second control unit 124, or the first control unit 113 may communicate with the third control unit 135 through the second control unit 124, so that the second control unit 124 (such as the power and clock management controller 272) and/or the third control unit 135 (such as the power and clock management controller 288) may generate the control signal having, for example, the high logic level to the third switch unit SW3 and generate the control signal having, for example, the low logic level to the fifth switch unit SW5, then the third switch unit SW3 is turned on and the fifth switch unit SW5 is not turned on, so as to provide the first working voltage V1 to the third area 130. In addition, the second control unit 124 (such as the wake-up and interrupt controller 274) and/or the third control unit 135 (such as the wake-up and interrupt controller 290) may provide the wake-up signal to the third control unit 135 (such as the power and clock management controller 290). Then, the third control unit 135 (such as the power and clock management controller 290) may generate the third clock signal to the third area 130 according to the wake-up signal, so as to provide the working clock required by the operation unit 131, the third second peripheral unit 132 and the second access unit 133, so that the third area 130 may complete the required task. At this time, the first area 110 and the third area 130 operate, but the second area 120 does not operate.

Then, after the third area 130 completes the required task, the second control unit 124 and/or the third control unit 135 may generate the control signal having, for example, the low logic level to the third switch unit SW3 and generate the control signal having, for example, the high logic level to the fifth switch unit SW5, so that the third switch unit SW3 is not turned on and the fifth switch unit SW5 is turned on, so as to provide the third working voltage V3 to the third storage unit 134 and the third control unit 135 of the third area 130, thereby maintaining the operation of the third storage unit 134 and the third control unit 135. At this time, the first area 110 still continues to operate. Therefore, the power consumption of the control device 100 may be effectively saved.

In some embodiments, the logic in the third area 130 may use a multiple threshold voltage (multi-vth) design technique, and the operation voltage thereof is between the overdrive voltage and the normal voltage. The logic in the second area 120 may use a high threshold voltage (high-vth) design technique, and the operation voltage thereof is between the normal voltage and the low voltage. The logic in the first area 110 may use an extreme high threshold voltage (extreme high-vth) design technique, and the operation voltage thereof is between the low voltage and the extreme low voltage.

In addition, in the embodiment, the elements in the first area 110 (i.e., the first peripheral unit, 111, the first storage unit 112 and the first control unit 113), the elements in the area 120 (i.e., the second peripheral unit 121, the first access unit 122, the second storage unit 123 and the second control unit 124) and the elements in the third area 130 (i.e., the operation unit 131, the third peripheral unit 132, the second access unit 133, the third storage unit 134 and the third control unit 135) use the same voltage (i.e., the first working voltage V1), so as avoid the need for installing the voltage lever converter, thereby saving the increase of the operation time caused by the voltage lever converter.

Figure 3:
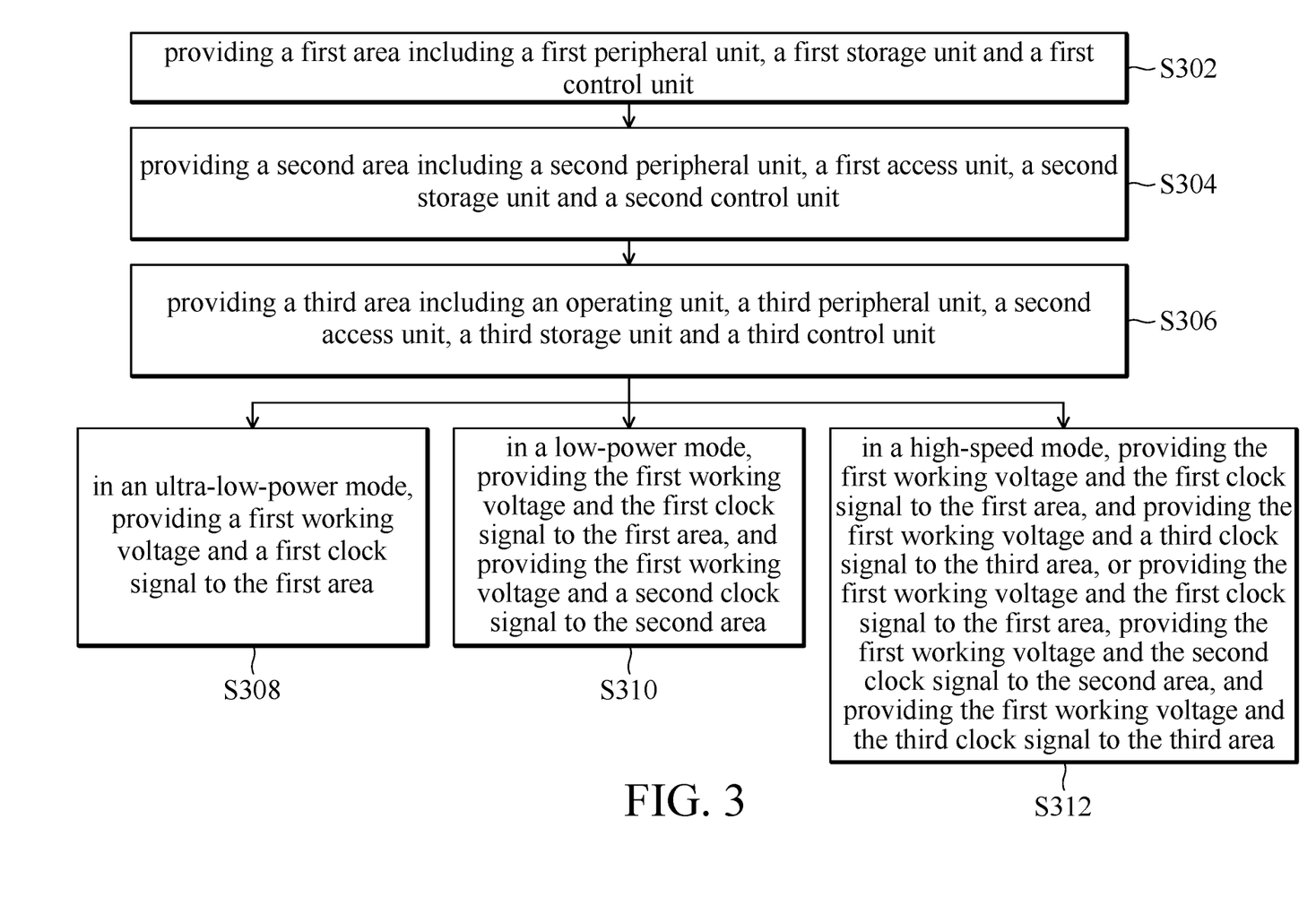
FIG. 3 is a flowchart of an operation method of a control electronic device according an embodiment of the present invention.

FIG. 3 is a flowchart of an operation method of a control electronic device according an embodiment of the present invention. In step S302, the method involves providing a first area including a first peripheral unit, a first storage unit and a first control unit. In step S304, the method involves providing a second area including a second peripheral unit, a first access unit, a second storage unit and a second control unit. In step S306, the method involves providing a third area including an operating unit, a third peripheral unit, a second access unit, a third storage unit and a third control unit. In step S308, the method involves in an ultra-low-power mode, providing a first working voltage and a first clock signal to the first area.

In step S310, the method involves in a low-power mode, providing the first working voltage and the first clock signal to the first area, and providing the first working voltage and a second clock signal to the second area. In step S312, the method involves in a high-speed mode, providing the first working voltage and the first clock signal to the first area, and providing the first working voltage and a third clock signal to the third area, or providing the first working voltage and the first clock signal to the first area, providing the first working voltage and the second clock signal to the second area, and providing the first working voltage and the third clock signal to the third area. In the embodiment, a number of elements of the first peripheral unit is, for example, less than a number of elements of the second peripheral unit, and the number of elements of the second peripheral unit is, for example, less than a number of elements of the third peripheral unit. In addition, a size of the first storage unit is, for example, smaller than a size of the second storage unit, and the size of the second storage unit is, for example, smaller than a size of the third storage unit.

Figure 4:
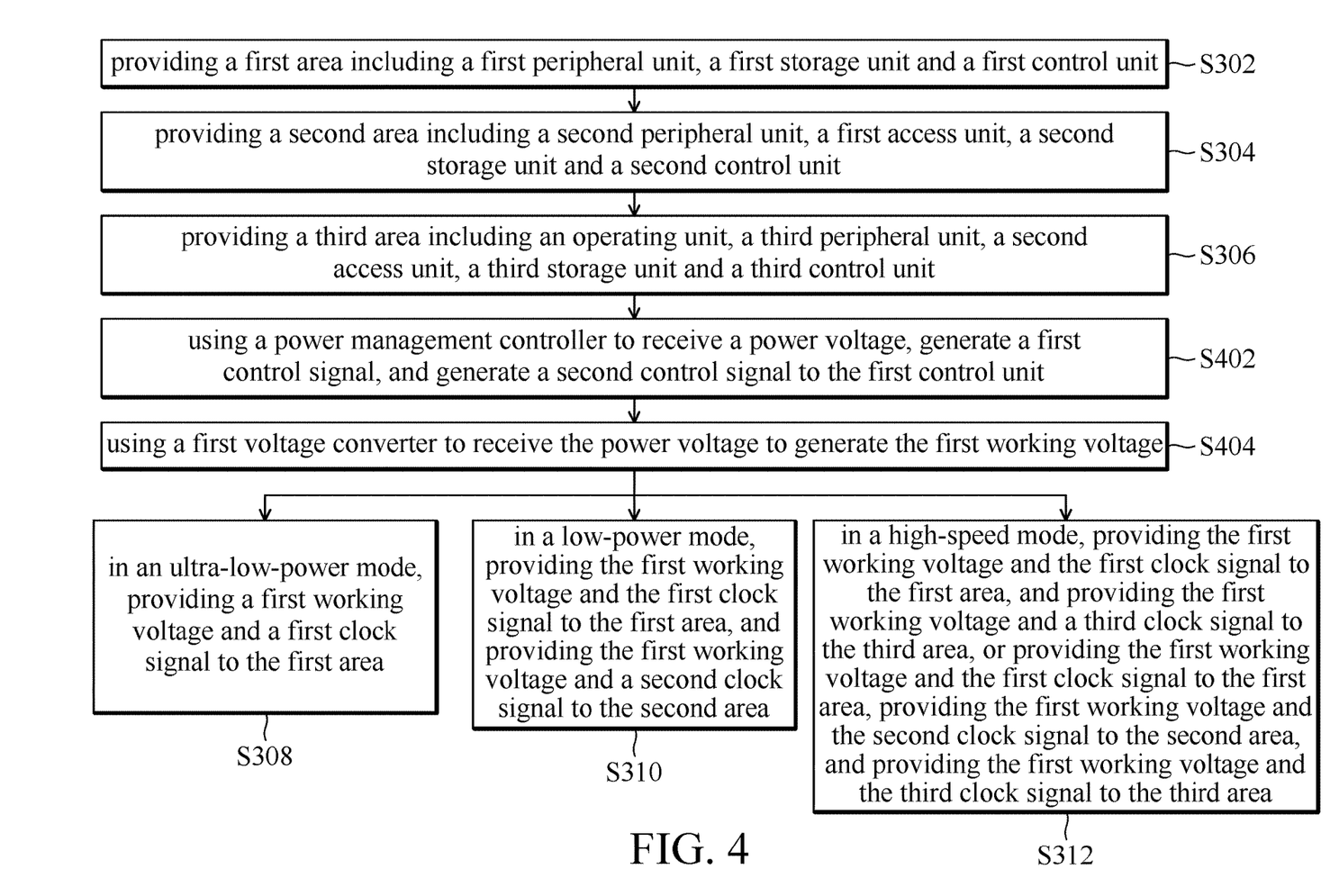
FIG. 4 is a flowchart of an operation method of a control device according another embodiment of the present invention.

FIG. 4 is a flowchart of an operation method of a control device according another embodiment of the present invention. In the embodiment, steps S302-S312 in FIG. 4 are the same as or similar to steps S302-S312 in FIG. 3. Accordingly, steps S302-S312 in FIG. 4 may refer to the description of the embodiment in FIG. 3, and the description thereof is not repeated herein. In step S402, the method involves using a power management controller to receive a power voltage, generate a first control signal, and generate a second control signal to the first control unit. In step S404, the method involves using a first voltage converter to receive the power voltage to generate the first working voltage.

In the embodiment, step S308 further includes in the ultra-low-power mode, using a first switch unit to provide the first working voltage to the first area and using the first control unit to provide the first clock signal to the first area according to the first control signal and the second control signal. Step S310 further includes in the low-power mode, using the first switch unit to provide the first working voltage to the first area and using the first control unit to provide the first clock signal to the first area according to the first control signal and the second control signal, and using a second switch to provide the first working voltage to the second area and using the second control unit to provide the second clock signal to the second area according to a control of the first control unit and/or the second control unit.

Step S312 further includes in the high-speed mode, using the first switch unit to provide the first working voltage to the first area and using the first control unit to provide the first clock signal to the first area according to the first control signal and the second control signal, using the second switch unit to provide the first working voltage to the second area and using the second control unit to provide the second clock signal to the second area according to the control of the first control unit and/or the second control unit, and using a third switch unit to provide the first working voltage to the third area and using the third control unit to provide the third clock signal to the third area according to a control of the second control unit and/or the third control unit.

Figure 5:
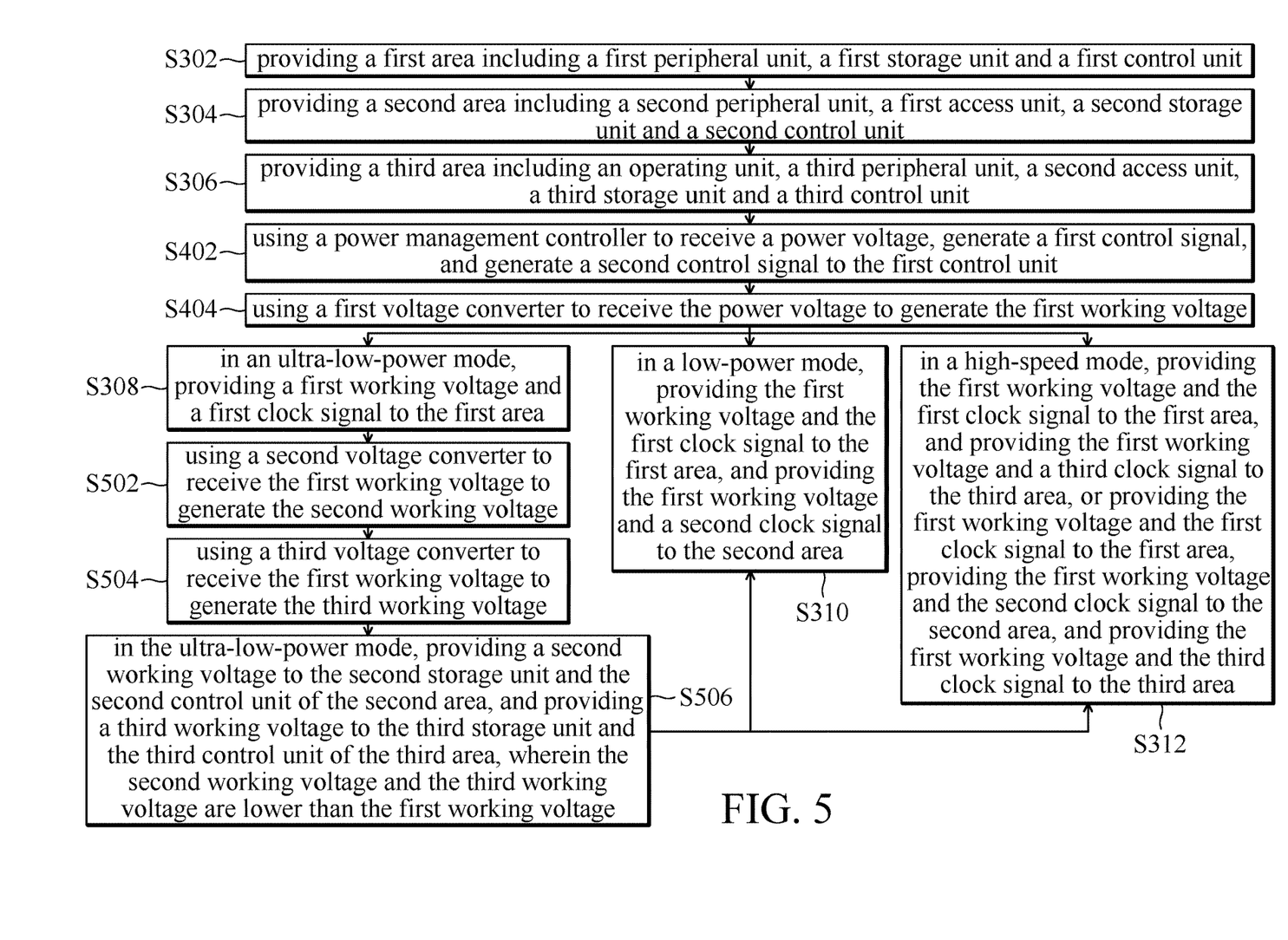
FIG. 5 is a flowchart of an operation method of a control device according another embodiment of the present invention.

FIG. 5 is a flowchart of an operation method of a control device according another embodiment of the present invention. In the embodiment, steps S302-S312 and S402-S404 in FIG. 5 are the same as or similar to steps S302-S312 and S402-S404 in FIG. 4. Accordingly, steps S302-S312 and S402-S404 in FIG. 5 may refer to the description of the embodiment in FIG. 4, and the description thereof is not repeated herein. In step S502, the method involves using a second voltage converter to receive the first working voltage to generate the second working voltage. In step S504, the method involves using a third voltage converter to receive the first working voltage to generate the third working voltage. In step S506, the method involves in the ultra-low-power mode, providing a second working voltage to the second storage unit and the second control unit of the second area, and providing a third working voltage to the third storage unit and the third control unit of the third area, wherein the second working voltage and the third working voltage are lower than the first working voltage.

In addition, step S506 further includes in the ultra-low-power mode, using a fourth switch unit to provide the second working voltage to the second storage unit and the second control unit of the second area according to the control of the first control unit and/or the second control unit, and using a fifth switch unit to provide the third working voltage to the third storage unit and the third control unit of the third area according to the control of the second control unit and/or the third control unit. Step S312 further includes in the high-speed mode, using the first switch unit to provide the first working voltage to the first area and using the first control unit to provide the first clock signal to the first area according to the first control signal and the second control signal, and using the third switch unit to provide the first working voltage to the third area and using the third control unit to provide the third clock signal to the third area according to the control of the second control unit and/or the third control unit.

In summary, according to the control device and the operation method thereof disclosed by the embodiment of the present invention, the first area, the second area and the third area are configured. The number of elements of the first area is less than the number of elements of the second area. The number of elements of the second area is less than the number of elements of the third area. The corresponding working voltages and clock signals are provided to the first area, the second area and/or the third area according to the different modes (i.e., the ultra-low-power mode, the low-power mode and the high-speed mode). Therefore, high speed and low power consumption may be achieved.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A control device, comprising:
   a first area, comprising a first peripheral unit, a first storage unit and a first control unit;
   a second area, comprising a second peripheral unit, a first access unit, a second storage unit and a second control unit; and
   a third area, comprising an operating unit, a third peripheral unit, a second access unit, a third storage unit and a third control unit;
   wherein in an ultra-low-power mode, a first working voltage and a first clock signal are provided to the first area;
   wherein in a low-power mode, the first working voltage and the first clock signal are provided to the first area, and the first working voltage and a second clock signal are provided to the second area;

wherein in a high-speed mode, the first working voltage and the first clock signal are provided to the first area, and the first working voltage and a third clock signal are provided to the third area, or the first working voltage and the first clock signal are provided to the first area, the first working voltage and the second clock signal are provided to the second area, and the first working voltage and the third clock signal are provided to the third area.

2. The control device as claimed in claim 1, wherein the first peripheral unit comprises a low power analog-to-digital converter, a pulse width modulator and a low-power timer, the first storage unit comprises a register, and the first control unit comprises a power and clock management controller and a wake-up and interrupt controller.

3. The control device as claimed in claim 1, wherein the second peripheral unit comprises a digital-to-analog converter, an operation amplifier, a timer, an inter-integrated circuit, a universal asynchronous receiver/transmitter and a serial peripheral interface, the first access unit comprises a low power direct memory access controller, the second storage unit comprises a low-power memory, and the second control unit comprises a power and clock management controller and a wake-up and interrupt controller.

4. The control device as claimed in claim 1, wherein the operation unit comprises a central processing unit, the third peripheral unit comprises a digital-to-analog converter, an analog-to-digital converter, a timer, an inter-integrated circuit, a universal series bus, a universal asynchronous receiver/transmitter, an analog comparator, a serial peripheral interface, a pulse width modulator, a quadrature encoder interface, a watch dog timer, a USB Type-C connector system software interface, a real time clock, a high speed internal RC oscillator, a medium speed internal RC oscillator, a general-purpose input/output port and a global miscellaneous control register, the second access unit comprises a first memory controller, a second memory controller, a peripheral direct memory access controller, a cache controller and a flash memory controller, the third storage unit comprises a first memory, a second memory, a cache memory, and a flash memory, and the third control unit comprises a power and clock management controller and a wake-up and interrupt controller.

5. The control device as claimed in claim 1, further comprising:
a power management controller, configured to receive a power voltage, generate a first control signal, and generate a second control signal to the first control unit;
a first voltage converter, configured to receive the power voltage to generate the first working voltage;
a first switch unit, configured to determine whether to provide the first working voltage to the first area according to the first control signal;
a second switch unit, configured to determine whether to provide the first working voltage to the second area according to a control of the first control unit and/or the second control unit; and
a third switch unit, configured to determine whether to provide the first working voltage to the third area according to a control of the second control unit and/or the third control unit.

6. The control device as claimed in claim 5, wherein in the ultra-low-power mode, a second working voltage is provided to the second storage unit and the second control unit of the second area, and a third working voltage is provided to the third storage unit and the third control unit of the third area;

wherein the second working voltage and the third working voltage are lower than the first working voltage.

7. The control device as claimed in claim 6, further comprising:
a second voltage converter, configured to receive the first working voltage to generate the second working voltage;
a fourth switch unit, configured to determine whether to provide the second working voltage to the second storage unit and the second control unit of the second area according to the control of the first control unit and/or the second control unit;
a third voltage converter, configured to receive the first working voltage to generate the third working voltage; and
a fifth switch unit, configured to determine whether to provide the third working voltage to the third storage unit and the third control unit of the third area according to the control of the second control unit and/or the third control unit.

8. The control device as claimed in claim 7, wherein each of the second voltage converter and the third voltage converter are a low dropout regulator.

9. The control device as claimed in claim 1, wherein a number of elements of the first peripheral unit is less than a number of elements of the second peripheral unit, and the number of elements of the second peripheral unit is less than a number of elements of the third peripheral unit.

10. The control device as claimed in claim 1, wherein a size of the first storage unit is smaller than a size of the second storage unit, and the size of the second storage unit is smaller than a size of the third storage unit.

11. An operation method of a control device, comprising:
providing a first area comprising a first peripheral unit, a first storage unit and a first control unit;
providing a second area comprising a second peripheral unit, a first access unit, a second storage unit and a second control unit;
providing a third area comprising an operating unit, a third peripheral unit, a second access unit, a third storage unit and a third control unit;
in an ultra-low-power mode, providing a first working voltage and a first clock signal to the first area;
in a low-power mode, providing the first working voltage and the first clock signal to the first area, and providing the first working voltage and a second clock signal to the second area; and
in a high-speed mode, providing the first working voltage and the first clock signal to the first area, and providing the first working voltage and a third clock signal to the third area, or providing the first working voltage and the first clock signal to the first area, providing the first working voltage and the second clock signal to the second area, and providing the first working voltage and the third clock signal to the third area.

12. The operation method of the control device as claimed in claim 11, wherein the first peripheral unit comprises a low power analog-to-digital converter, a pulse width modulator and a low-power timer, the first storage unit comprises a register, and the first control unit comprises a power and clock management controller and a wake-up and interrupt controller.

13. The operation method of the control device as claimed in claim 11, wherein the second peripheral unit comprises a digital-to-analog converter, an operation amplifier, a timer, an inter-integrated circuit, a universal asynchronous receiver/transmitter and a serial peripheral interface, the first access unit comprises a low power direct memory access controller, the second storage unit comprises a low-power memory, and the second control unit comprises a power and clock management controller and a wake-up and interrupt controller.

14. The operation method of the control device as claimed in claim 11, wherein the operation unit comprises a central processing unit, the third peripheral unit comprises a digital-to-analog converter, an analog-to-digital converter, a timer, an inter-integrated circuit, a universal series bus, a universal asynchronous receiver/transmitter, an analog comparator, a serial peripheral interface, a pulse width modulator, a quadrature encoder interface, a watch dog timer, a USB Type-C connector system software interface, a real time clock, a high speed internal RC oscillator, a medium speed internal RC oscillator, a general-purpose input/output port and a global miscellaneous control register, the second access unit comprises a first memory controller, a second memory controller, a peripheral direct memory access controller, a cache controller and a flash memory controller, the third storage unit comprises a first memory, a second memory, a cache memory, and a flash memory, and the third control unit comprises a power and clock management controller and a wake-up and interrupt controller.

15. The operation method of the control device as claimed in claim 11, further comprising:
using a power management controller to receive a power voltage, generate a first control signal, and generate a second control signal to the first control unit;
using a first voltage converter to receive the power voltage to generate the first working voltage;
wherein the step of in the ultra-low power mode, providing the first working voltage and the first clock signal are provided to the first area comprises in the ultra-low power mode, using a first switch unit to provide the first working voltage to the first area and using the first control unit to provide the first clock signal to the first area according to the first control signal and the second control signal;
wherein the step of in the low power mode, providing the first working voltage and the first clock signal to the first area, and providing the first working voltage and the second clock signal to the second area comprises in the low-power mode, using the first switch unit to provide the first working voltage to the first area and using the first control unit to provide the first clock signal to the first area according to the first control signal and the second control signal, and using a second switch to provide the first working voltage to the second area and using the second control unit to provide the second clock signal to the second area according to a control of the first control unit and/or the second control unit;
wherein the step of in the high-speed mode, providing the first working voltage and the first clock signal to the first area, providing the first working voltage and the second clock signal to the second area, and providing the first working voltage and the third clock signal to the third area comprises in the high-speed mode, using the first switch unit to provide the first working voltage to the first area and using the first control unit to provide the first clock signal to the first area according to the first control signal and the second control signal, using the second switch unit to provide the first working voltage to the second area and using the second control unit to provide the second clock signal to the second area according to the control of the first control unit and/or the second control unit, and using a third switch unit to provide the first working voltage to the third area and using the third control unit to provide the third clock signal to the third area according to a control of the second control unit and/or the third control unit.

16. The operation method of the control device as claimed in claim 15, further comprising:
in the ultra-low-power mode, providing a second working voltage to the second storage unit and the second control unit of the second area, and providing a third working voltage to the third storage unit and the third control unit of the third area;
wherein the second working voltage and the third working voltage are lower than the first working voltage.

17. The operation method of the control device as claimed in claim 16, further comprising:
using a second voltage converter to receive the first working voltage to generate the second working voltage;
using a third voltage converter to receive the first working voltage to generate the third working voltage;
wherein the step of in the ultra-low-power mode, providing the second working voltage to the second storage unit and the second control unit of the second area, and providing the third working voltage to the third storage unit and the third control unit of the third area comprises in the ultra-low-power mode, using a fourth switch unit to provide the second working voltage to the second storage unit and the second control unit of the second area according to the control of the first control unit and/or the second control unit, and using a fifth switch unit to provide the third working voltage to the third storage unit and the third control unit of the third area according to the control of the second control unit and/or the third control unit;
wherein the step of in the high-speed mode, providing the first working voltage and the first clock signal to the first area, and providing the first working voltage and a third clock signal to the third area comprises in the high-speed mode, using the first switch unit to provide the first working voltage to the first area and using the first control unit to provide the first clock signal to the first area according to the first control signal and the second control signal, and using the third switch unit to provide the first working voltage to the third area and using the third control unit to provide the third clock signal to the third area according to the control of the second control unit and/or the third control unit.

18. The operation method of the control device as claimed in claim 17, wherein each of the second voltage converter and the third voltage converter are a low dropout regulator.

19. The operation method of the control device as claimed in claim 11, wherein a number of elements of the first peripheral unit is less than a number of elements of the second peripheral unit, and the number of elements of the second peripheral unit is less than a number of elements of the third peripheral unit.

20. The operation method of the control device as claimed in claim 11, wherein a size of the first storage unit is smaller than a size of the second storage unit, and the size of the second storage unit is smaller than a size of the third storage unit.

* * * * *